(12) United States Patent
Zheng et al.

(10) Patent No.: US 11,300,489 B2
(45) Date of Patent: Apr. 12, 2022

(54) SAND GRAIN CORROSION TESTING DEVICE

(71) Applicant: CITIC Dicastal CO., LTD., Hebei (CN)

(72) Inventors: Liqun Zheng, Qinhuangdao (CN); Jinpeng Han, Qinhuangdao (CN)

(73) Assignee: CITIC Dicastal CO., LTD., Qinhuangdao (CN)

(*) Notice: Subject to any disclaimer, the term of this patent is extended or adjusted under 35 U.S.C. 154(b) by 457 days.

(21) Appl. No.: 16/512,410

(22) Filed: Jul. 16, 2019

(65) Prior Publication Data
US 2020/0173897 A1    Jun. 4, 2020

(30) Foreign Application Priority Data

Dec. 4, 2018 (CN) .......................... 201811473243.1

(51) Int. Cl.
G01N 3/56 (2006.01)
G01N 3/04 (2006.01)

(52) U.S. Cl.
CPC ............... G01N 3/567 (2013.01); G01N 3/04 (2013.01)

(58) Field of Classification Search
CPC .......... G01N 3/565; G01N 3/567; G01N 3/04; B03B 9/00; B07B 1/28
USPC .............................................................. 73/7
See application file for complete search history.

(56) References Cited

U.S. PATENT DOCUMENTS 4,493,206 A * 1/1985 Johnson ................. G01N 3/567 384/317
9,121,804 B2 * 9/2015 Ramrattan ............. G01N 3/565

FOREIGN PATENT DOCUMENTS

| CN | 203956770 U | 11/2014 |
| CN | 104880377 B | 7/2018 |
| CN | 108303334 * | 7/2018 |
| CN | 208043577 U | 11/2018 |

OTHER PUBLICATIONS

European Search Report in the European application No. 19205997.0, dated May 13, 2020.

* cited by examiner

Primary Examiner — Octavia Hollington
(74) Attorney, Agent, or Firm — Syncoda LLC; Feng Ma

(57) ABSTRACT

A sand grain corrosion testing device includes a substrate and universal wheels, a collecting hopper is arranged on one side of a top end of first guiding rods; three sets of buffer plates inclined downwards are arranged on an inner side wall of the collecting hopper; a scale rod is arranged at one side of hydraulic devices; an impact box body is supported and mounted on a part, on one side of the scale rod, of the substrate through the supporting legs; a clamp is obliquely mounted on one side of the impact box body; a discharging outlet at the bottom of the impact box body communicates with a collecting tank; one side of the collecting tank is connected with a sand pump; and one side of the sand pump penetrates through a sealing cover plate and communicates with the interior of the collecting hopper.

7 Claims, 3 Drawing Sheets

SAND GRAIN CORROSION TESTING DEVICE

CROSS-REFERENCE TO RELATED APPLICATION

The present application claims priority to Chinese Patent Application No. 201811473243.1, filed on Dec. 4, 2018, the contents of which are hereby incorporated by reference in its entirety.

BACKGROUND

In the machining process of hubs, it is necessary to carry out the impact sand grain corrosion test on hub slices. When the existing sand grain corrosion testing device is used, the impact height is not adjustable, quantitative sand grains need to be put into a hopper manually for impact of the hub slices, the efficiency is low, in addition, dust is prone to being generated while the sand grains are poured, consequently, harm to the human bodies and environmental pollution are caused, and the weights of the sand grains need to be recorded every time during impact of the hub slices, which are liable to recording errors.

SUMMARY

The present disclosure belongs to the technical field of hub slice tests, and particularly relates to a sand grain corrosion testing device.

The object of the present disclosure is to provide a sand grain corrosion testing device, the impact height is convenient to adjust, automatic sand grain charging is achieved, the testing efficiency is improved, in addition, the sand output is indirectly calculated by recording the operation time of a sand pump, the quantitative impact test is achieved, manual recording errors are avoided, thus, the accuracy is improved; by arranging a sealing cover plate structure at top of a collecting hopper, dust is not caused during charging, and the harm to the human bodies and environmental pollution caused by dust are avoided, so that the problems in the background are solved.

In order to achieve the above object, the present disclosure adopts the following technical scheme that a sand grain corrosion testing device includes a substrate and universal wheels which are arranged at the bottom of the substrate and mounted through supporting legs; hydraulic devices are arranged on one side of the top of the substrate; output ends of the hydraulic devices are connected with first guiding rods through supporting blocks respectively; a collecting hopper having a sealing cover plate is arranged on one side of top ends of the first guiding rods; three sets of buffer plates inclined downwards are arranged on the inner side wall of the collecting hopper; a scale rod is mounted on one side of the hydraulic devices; an impact box body is supported and mounted on a part, on one side of the scale rod, of the substrate through supporting legs; a clamp is obliquely mounted on one side of the impact box body through a supporting rod; a discharging tube located at the bottom of the collecting hopper extends into the impact box body and is located at the top of the clamp; a discharging outlet located at the bottom of the impact box body communicates with a collecting tank; a sand pump is connected to one side of the collecting tank through a guide tube; and one side of the sand pump penetrates through the sealing cover plate through a material conveying tube and communicates with interior of the collecting hopper.

Preferably, the collecting hopper is fixed on the first guiding rods through support blocks and locking bolts penetrate through the support blocks.

Preferably, each hydraulic device may include a hydraulic cylinder and a piston rod arranged at output end of the hydraulic cylinder.

Preferably, the clamp may include a clamping plate, four sets of fixing blocks and four sets of adjusting bolts, the four sets of the fixing blocks are arranged on four sides of the clamping plate respectively, and the adjusting bolts penetrate through the fixing blocks respectively.

Preferably, the sand pump is a 4-inch sand pump.

Preferably, the collecting hopper is provided with a first rectangular viewing window, and a second rectangular viewing window is arranged in a position, close to the clamp, of the impact box body.

Preferably, a plane of inner bottom of the collecting tank is inclined towards the guide tube.

Compared with the related art, the sand grain corrosion testing device has the following advantages: the collecting hopper can be adjusted, and in cooperation with the scale rod structure, the impact height can be adjusted conveniently; sand grains in the collecting tank are pumped into the collecting hopper through the sand pump, full-automatic sand charging is achieved, the testing efficiency is improved; in addition, the sand outlet is indirectly calculated by recording the operation time of the sand pump, the quantitative impact test is achieved, manual recording errors are avoided, and the accuracy is improved; and by arranging the sealing cover plate structure at the top of the collecting hopper, dust is not caused at the collecting hopper during charging, and the harm to the human bodies and environmental pollution caused by dust are avoided.

BRIEF DESCRIPTION OF THE DRAWINGS

The present disclosure will become more fully understood from the detailed description given hereinbelow and the accompanying drawings, which are given by illustration only, and thus are not limitative of the present disclosure, and wherein.

LIST OF REFERENCE SYMBOLS

1—substrate, 2—universal wheel, 3—hydraulic device, 301—hydraulic cylinder, 302—piston rod, 4—supporting block, 5—first guiding rod, 6—sealing cover plate, 7—support block, 8—collecting hopper, 801—discharging tube, 802—first rectangular viewing window, 9—buffer plate, 10—sand pump, 11—material conveying tube, 12—impact box body, 121—discharging outlet, 122—second rectangular viewing window, 13—supporting rod, 14—clamp, 141—clamping plate, 142—fixing block, 143—adjusting bolt, 15—collecting tank, 16—guide tube and 17—scale rod.

DETAILED DESCRIPTION

The technical solutions of the embodiments of the present disclosure will be described clearly and completely below with reference to the drawings of the embodiments of the present disclosure.

Figure 1:
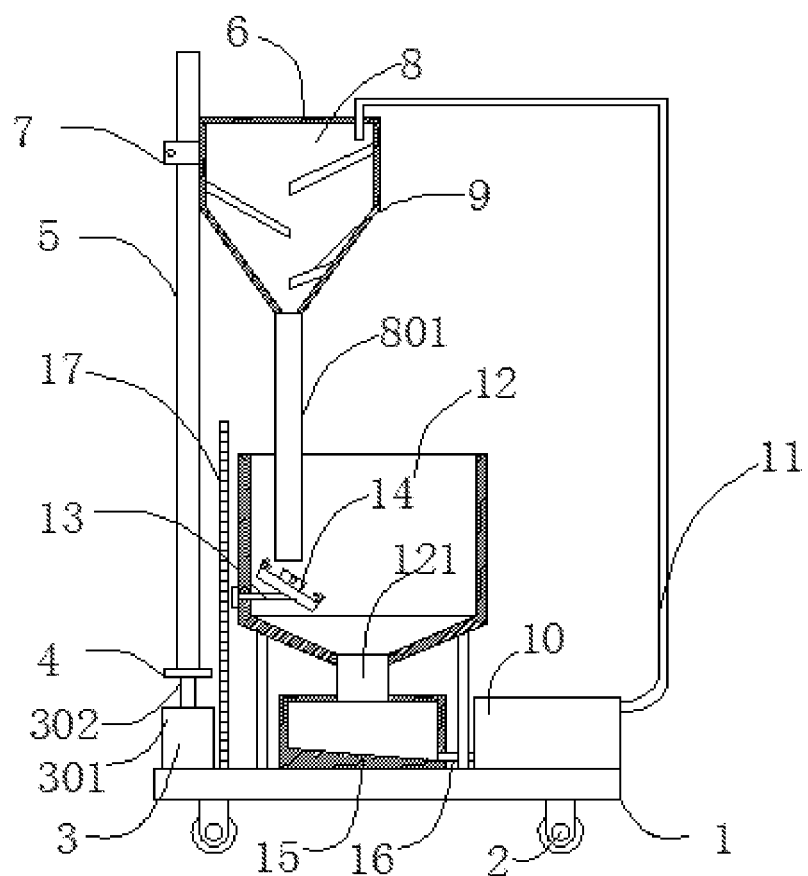
FIG. 1 is a partial sectional structural diagram of a sand grain corrosion testing device of the present disclosure.
Figure 2:
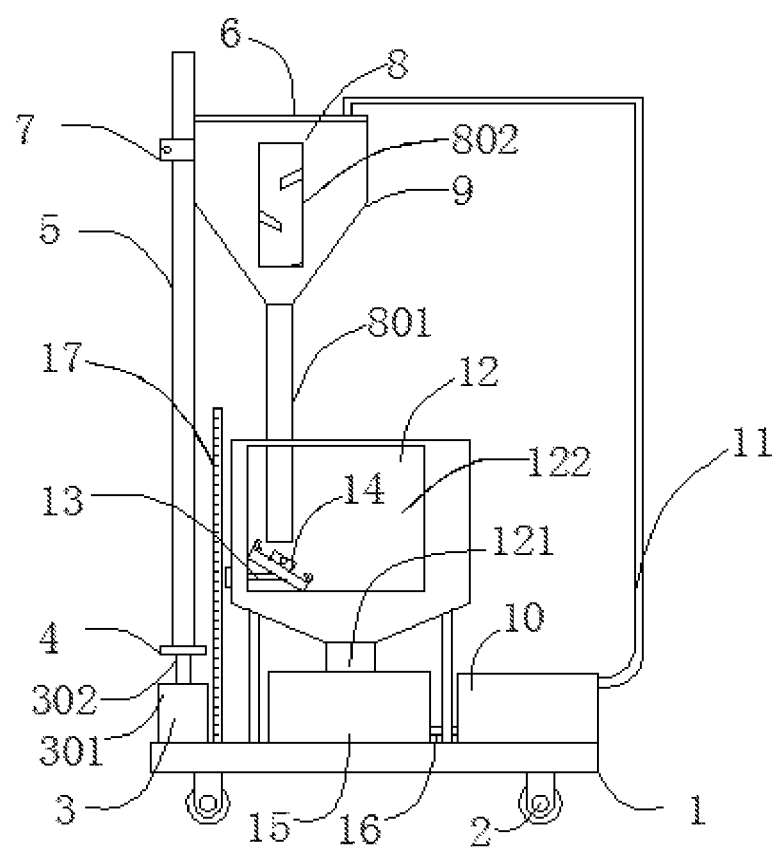
FIG. 2 is a structural diagram of a sand grain corrosion testing device of the present disclosure.
Figure 3:
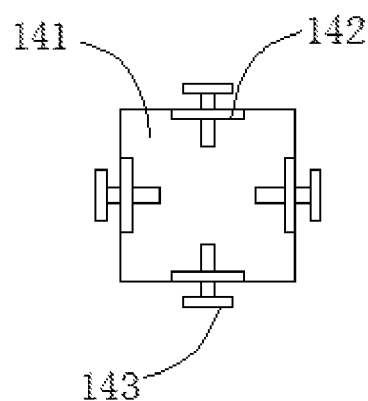
FIG. 3 is a planar structural diagram of a clamp of a sand grain corrosion testing device of the present disclosure.

The present disclosure provides a sand grain corrosion testing device, as shown in FIGS. 1-3. The sand grain corrosion testing device includes a substrate 1 and universal wheels 2 which are arranged at the bottom of the substrate 1 and mounted through supporting legs, and the device is convenient to move by arranging the universal wheel 2 structures; hydraulic devices 3 are arranged on the two sides of the top of the substrate 1; the output ends of the hydraulic devices 3 are connected with first guiding rods 5 through supporting blocks 4 respectively; the top ends of the first guiding rods 5 are provided with a collecting hopper 8 having a sealing cover plate 6, and the height of the collecting hopper 8 can be adjusted by operating the hydraulic devices 3; the inner side wall of the collecting hopper 8 is provided with three sets of buffer plates 9 downwards inclined, and the falling speed of sanding grains can be decreased through the three sets of buffer plate 9 structures, so that the initial falling speed is zero; a scale rod 17 is arranged at one side of the hydraulic devices 3; an impact box body 12 is supported and mounted on a part, on one side of the scale rod 17, of the substrate 1 through supporting legs; one side of the impact box body 12 is obliquely provided with a clamp 14 through a supporting rod 13; the clamp 14 is used for clamping and fixing tested hub slices; a discharging tube 801 at the bottom of the collecting hopper 8 extends into the impact box body 12 and is located at the top of the clamp 14; a discharging outlet 121 at the bottom of the impact box body 12 communicates with a collecting tank 15; one side of the collecting tank 15 is connected with a sand pump 10 through a guide tube 16; one side of the sand pump 10 penetrates through the sealing cover plate 6 through a material conveying tube 11 and communicates with the interior of the collecting hopper 8; and the material conveying tube 11 is of a rigid pipe structure.

Preferably, the collecting hopper 8 is fixed on the first guiding rods 5 through support blocks 7, and locking bolts penetrate through the support blocks 7.

By adopting the technical solutions above, the collecting hopper 8 is fixedly mounted through the support blocks 7, so that the mounting and fixing are convenient.

Preferably, each hydraulic device 3 includes a hydraulic cylinder 301 and a piston rod 302 arranged at the output end of the hydraulic cylinder 301.

By adopting the technical solutions, the piston rods 302 are pushed up and down by the hydraulic cylinders 301, and the structures on the first guiding rods 5 and a second guiding rod 6 can be adjusted to lift up and down.

Preferably, the clamp 14 includes a clamping plate 141, four sets of fixing blocks 142 and four sets of adjusting bolts 143; four sets of the fixing blocks 142 are arranged on the four sides of the clamping plate 141 respectively, and the adjusting bolts 143 penetrate through the fixing blocks 142 respectively.

By adopting the technical solutions, a hub slice is arranged on the clamping plate 141, and the workpiece is locked and fixed by rotating the adjusting bolts 143.

Preferably, the sand pump 10 is a 4-inch sand pump.

By adopting the technical solutions, the 4-inch sand pump and a 100-horsepower diesel engine are adopted, the maximum lift is up to 10 m, and the sand output is indirectly calculated by recording the operation time of the sand pump 10.

Preferably, the collecting hopper 8 is provided with a first rectangular viewing window 802, and a second rectangular viewing window 122 is arranged at the position, close to the clamp 14, of the impact box body 12.

By adopting the technical solutions, the first rectangular viewing window structure 802 and the second rectangular viewing window structure 122 are adopted, the first rectangular viewing window 802 is used for observing the sand feeding condition in the collecting hopper 8, and the second rectangular viewing window 122 is used for observing the corrosion state of the hub slice workpiece.

Preferably, the plane of the inner bottom of the collecting tank 15 is inclined towards one side of the guide tube 16.

By adopting the technical solutions, the plane of the inner bottom of the collecting tank 15 is inclined towards one side of the guide tube 16, and thus the sand grains in the collecting tank 15 can be pumped away conveniently when the sand pump 10 is operated.

The operation principle is as follows: the hub slice to be tested is clamped and fixed through the clamp 14 in the impact box body 12, the vertical height of the collecting hopper 8 is adjusted by the operation of the hydraulic devices 3, sand grains for testing are poured into the collecting tank 15, the sand pump 10 is operated for conveying the sand grains in the collecting tank 15 into the collecting hopper 8 through the material conveying tube 11, the falling speed of the sand grains can be decreased through the buffer plates 9 arranged in the collecting hopper 8, thus ensuring that the initial speed is zero, the sand grains impact the hub slice when falling along the discharging tube 801, the falling sand grains flow back into the collecting tank 15 through the discharging outlet 121, thus, a full-automatic circulating sand grain corrosion test is achieved, the corrosion condition of the hub slice can be known through the second rectangular viewing window, when the corrosion condition of the hub slice reaches the requirement, the sand pump 10 is stopped operating, and the sand output is indirectly calculated by recording the operation time of the sand pump 10, so that the quantitative test is facilitated.

Finally, it should be noted that the above descriptions are only preferred embodiments of the present disclosure and are not intended to limit the present disclosure. Although the present disclosure has been described in detail with reference to the foregoing embodiments, those skilled in the art may still modify the technical solutions described in the foregoing embodiments or equivalently replace some of the technical features, and any modifications, equivalent substitutions, improvements and the like which are made within the spirit and principles of the present disclosure should be included in the scope of protection of the present disclosure.

The invention claimed is:

1. A sand grain corrosion testing device, comprising a substrate (1) and universal wheels (2) which are arranged at a bottom of the substrate (1) and mounted through supporting legs, wherein hydraulic devices (3) are arranged on one side of a top of the substrate (1); output ends of the hydraulic devices (3) are connected with first guiding rods (5) through supporting blocks (4) respectively; a collecting hopper (8) having a sealing cover plate (6) is arranged on one side of a top end of the first guiding rods (5); three sets of buffer plates (9) inclined downwards are arranged on an inner side wall of the collecting hopper (8); a scale rod (17) is arranged at one side of the hydraulic devices (3); an impact box body (12) is supported and mounted on a part, on one side of the scale rod (17), of the substrate (1) through supporting legs; a clamp (14) is obliquely mounted on one side of the impact box body (12) through a supporting rod (13); a discharging tube (801) located at the bottom of the collecting hopper (8) extends into the impact box body (12) and is located at the top of the clamp (14); a discharging outlet (121) located at the bottom of the impact box body (12) communicates with a collecting tank (15); a sand pump (10) is connected to one side of the collecting tank (15) through a guide tube (16); and one side of the sand pump (10) penetrates through the sealing cover plate (6) through a material conveying tube (11) and communicates with an interior of the collecting hopper (8).

2. The sand grain corrosion testing device according to claim 1, wherein the collecting hopper (8) is fixed on the first guiding rods (5) through support blocks (7), and locking bolts penetrate through the support blocks (7).

3. The sand grain corrosion testing device according to claim 1, wherein the hydraulic devices (3) comprise hydraulic cylinders (301) and piston rods (302) arranged at output ends of the hydraulic cylinders (301).

4. The sand grain corrosion testing device according to claim 1, wherein the clamp (14) comprises a clamping plate (141), four sets of fixing blocks (142) and four sets of adjusting bolts (143), the four sets of the fixing blocks (142) are arranged on four sides of the clamping plate (141) respectively, and the adjusting bolts (143) penetrate through the fixing blocks (142) respectively.

5. The sand grain corrosion testing device according to claim 1, wherein the sand pump (10) is a 4-inch sand pump.

6. The sand grain corrosion testing device according to claim 1, wherein the collecting hopper (8) is provided with a first rectangular viewing window (802), and a second rectangular viewing window (122) is arranged in a position, close to the clamp (14), of the impact box body (12).

7. The sand grain corrosion testing device according to claim 1, wherein a plane of inner bottom of the collecting tank (15) is inclined towards the guide tube (16).

* * * * *